Figure 1:
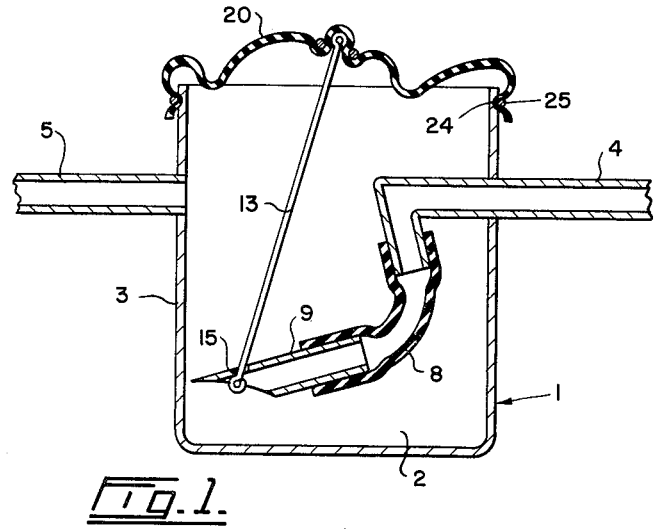

Dec. 14, 1965   E. E. CRIDDLE   3,223,116
PRESSURE REGULATOR HAVING A CRIMPABLE VALVE ELEMENT
Filed April 26, 1963   2 Sheets-Sheet 1

INVENTOR
ERNEST EDWARD CRIDDLE
BY
Lawrence J Field
ATTORNEY

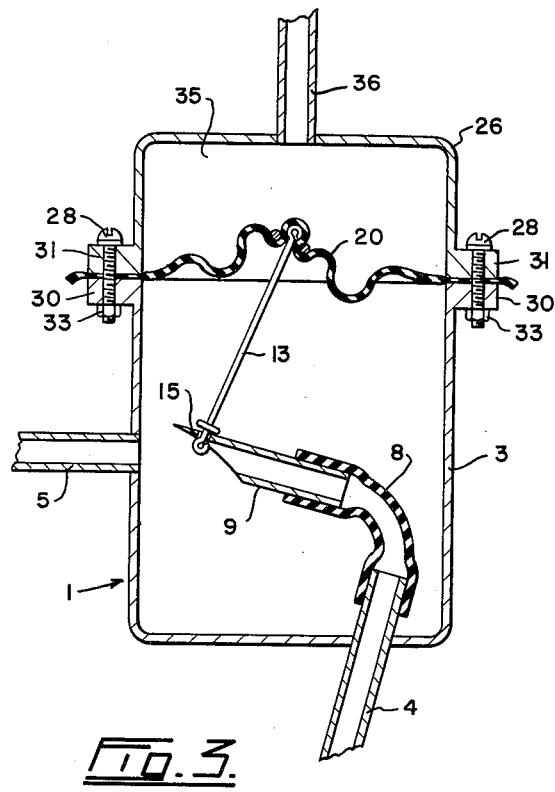

United States Patent Office 3,223,116
Patented Dec. 14, 1965

3,223,116
PRESSURE REGULATOR HAVING A CRIMP-
ABLE VALVE ELEMENT
Ernest E. Criddle, Ottawa, Ontario, Canada, assignor to
Her Majesty the Queen in right of Canada as represented by the Minister of National Defence
Filed Apr. 26, 1963, Ser. No. 276,045
Claims priority, application Canada, Apr. 30, 1962,
847,860
5 Claims. (Cl. 137—505.13)

This invention relates to valves and in particular to fluid pressure control valve. These valves are particularly suitable for use with gas electrodes where gas pressure control is of primary importance.

At present in many applications pressure control within a tolerance of plus or minus a few millimeters of mercury may be accomplished by manually balancing supply with demand by means of servo-mechanisms. Control may also be partially accomplished, at present by commercially available, gas cylinder pressure regulators, but these are subject to sticking and/or leaking valves, and other mechanical failures and at best provide reliable pressure control only to plus or minus one pound per square inch. Until now efficient constant pressure, variable flow control valve systems required manual operation or regulation. Use of presently known pressure regulators is also limited as a result of the fact that work is required to displace the spring diaphragm system which operates the valve. The work required to move these systems must come from the effluent gas pressure, hence the pressure change must be finite although it may be small if the valve is well designed.

The present invention eliminates the necessity of constant manual adjustment by the use of a simply constructed valve mechanism in which pressure control is obtained automaticallly once the valve has been manually adjusted to obtain the desired effluent fluid pressure.

Additionally by employing the valve mechanism of the present invention fluent fluid pressure which vary by as much as 500 millimeters of mercury may be controlled to give an effluent fluid pressure which may vary by as little as 2 millimeters of mercury at flow rates which can vary from almost 0 to 1 liter per minute. The valve mechanism of the present invention has been found suitable for controlling effluent pressures from about 2 mm. of mercury (0.04 p.s.i.) up to about 1000 p.s.i. provided that the pressure drop across the mechanism does not exceed about 25 p.s.i.

Also, due to the design of the valve mechanism of the present invention, very little work is required to actuate it thus enabling the valve to automatically maintain a very fine control over effluent gas pressures.

One embodiment of the valve mechanism of the present invention includes a flexible diaphragm which is movable as a result of a very small change in pressure on it, and a tubular valve which is closed by crimping. The crimpable tubular valve and the movable diaphragm are interconnected in such a manner that the diaphragm controls the degree of crimping of the tubular valve.

Figure 2:
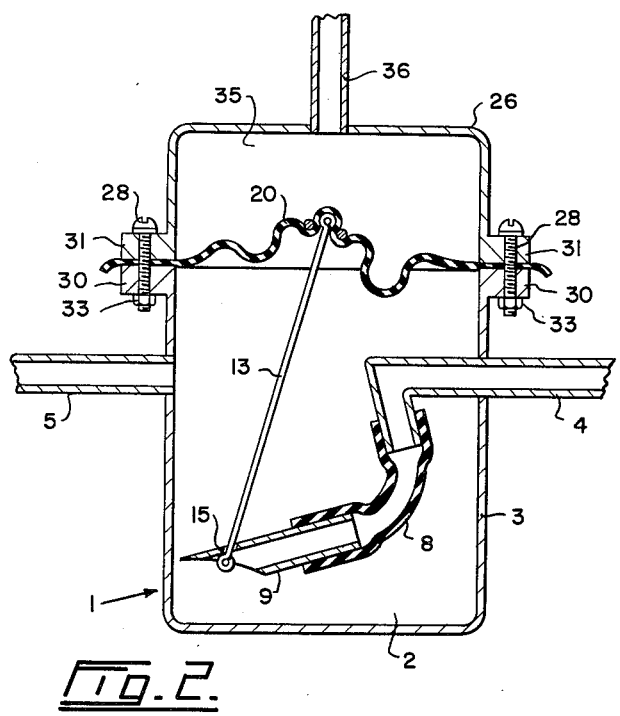

Three embodiments of the invention, with each being usable under a different set of conditions are illustrated in the accompanying drawings wherein:

FIGURE 1 is a cross-sectional view in elevation of one form of fluid pressure control valve mechanism constructed in accordance with the present invention for use in controlling fluid feed pressures at or near one atmosphere pressure;

FIGURE 2 is a cross-sectional view in elevation illustrating another embodiment of the invention for controlling pressures at or slightly above the pressure in the control chamber, and is normally used to control fluid feed pressures considerably above or below one atmosphere; and FIGURE 3 is a cross-sectional view in elevation of a yet further embodiment of the valve mechanism of the invention with this arrangement being used to control exhaust pressures or suctions to values at or slightly below the pressure in the control chamber and is normally used to control exhaust pressures or suctions as a pressure relief valve or as available from an aspirator or a vacuum pump or in conjunction with a solenoid to control blow-off of inert gases from a fuel cell or fuel cell battery train.

With reference to FIGURE 1, the valve mechanism, generally referred to by the reference numeral 1 consists of a cylindrical casing 3, formed from a suitable material, having an open upper end and a closed lower end, the material used in the casing being dependent on the nature of the fluid coming into contact with it and on the pressures to which the casing is to be subjected. An inlet duct 4 and an outlet duct 5 are provided in the casing 3. The inlet duct 4 projects into the chamber 2 and its end within the chamber is bent downwardly at a predetermined angle.

A valve tube 8 is secured over the end of the duct 4 within the chamber 2 and is maintained there by friction or preferably by suitable mechanical means. The tube 8 is as chemically inert as possible to the fluid, the pressure of which is to be controlled by the valve mechanism, and should be capable of being repeatedly crimped to close it and uncrimped without failure, and without developing any undue permanent distortion. It is to be noted that the angle at which duct 4 is bent downwardly will determine to some extent the ease with which tube 8 can be crimped and so to some extent the effluent pressure available from the valve mechanism. The crimpability of this tube 8, which functions as the valve in the valve mechanism of the present invention, will vary with length, diameter, strength and degree of pre-stressing of the tube.

For example when rubber tubing is used for the valve a smaller pressure change will cause it to flex and crimp if it is pre-stressed in a crimped form as, for example, in an oven at 80° C. for 24 hours, before placing it in service.

It is contemplated that, depending upon the use which a valve mechanism constructed in accordance with the present invention is to be put, other suitable forms of easily operated valves could be employed in place of valve tube 8 although the disclosed form of valve is to be preferred.

To the loose end of the valve tube 8 there is connected a rigid tube 9 having its free end bevelled. A rigid wire 13 with one of its ends enlarged is inserted through a hole 15 in the bevelled portion of the tube 9 and subsequently the other end of the wire is enlarged. The enlarged end of the wire 13, adjacent the hole 15 in the bevelled portion of the tube 9, is larger than the hole 15 and is located in the tube 9 so that when the valve mechanism is in operation the wire 13 upon being moved in an upward direction will draw the tube 9 with it and thus the free end of the tubular valve 8. A less preferred form of the invention would omit tube 9 and have the wire 13 passing through the valve tube 8.

A fluid tight, flexible diaphragm 20 is secured over the open upper end of the cylinder casing 3 and is retained there by means of a wire, string, thread, or band 25 which clamps the perimeter of the flexible diaphragm down about the outer surface of the casing 3 adjacent its open end with the diaphragm being clamped between the wire 25 and a groove 24 which encircles the casing. Chamber 2 is thus rendered fluid tight except of course for the inlet and outlet ducts.

A connection between the free, upper, enlarged end of the wire 13 and the diaphragm 20 is effected by fastening the diaphragm over the enlarged end with wire or other suitable material. The enlarged end of the wire 13 in contact with the diaphragm 20 must be rounded and smooth to prevent puncturing of the diaphragm during operation of the valve mechanism.

The diaphragm 20 should be mounted on casing 3 with sufficient slack to permit its movement in an amount sufficient to draw up and crimp the valve tube 8 completely closed under the influence of fluid pressure without the diaphragm 20 actually expanding. The stiffness or resistance to movement of the diaphragm can be increased by adding weights to the diaphragm at the point of connection of the wire 13 to the diaphragm 20. This will raise the value of the pressure required to move the diaphragm 20 and hence to crimp the valve tube 8. The flexibility of the diaphragm will determine to some extent the effluent operating pressure of the valve mechanism and its flexibility will depend upon such factors as the thickness and type of material employed for the diaphragm.

Additionally it has been found that when the diaphragm is formed of rubber and the fluid flowing through the valve chamber is oxygen the diaphragm deteriorates very quickly. To alleviate this problem, it is possible to coat the rubber with polyvinylidene chloride plastic by coating the diaphragm with a solution of this plastic in acetone and allowing the acetone to evaporate. The resultant coat does not appreciably affect the flexibility of the rubber, but prolongs its life when exposed to pure oxygen. Other special operating conditions may also necessitate other special considerations being given to the design of the diaphragm in addition to other parts of the valve mechanism.

Under certain operating conditions it may be possible to replace the diaphragm 20 with a suitable piston-cylinder arrangement although in view of its low mass and ease of movement the diaphragm is to be preferred.

With the valve mechanism 1 suitably installed in a fluid system, its operation is as follows.

Fluid, at a pressure higher than the desired effluent fluid pressure, is fed into the chamber 2 and when the effluent fluid reaches the desired pressure, pressure is exerted against the diaphragm 20 causing it to move outwardly against the atmosphere. When the diaphragm 20 is thus displaced it draws the stiff wire 13, the bevelled tube 9 and the free end of the tubular valve 8 with it, eventually causing the tube 8 to crimp closed thus interrupting the flow of fluid through the valve and preventing any further increase in effluent fluid pressure. As the fluid in the chamber is constantly escaping through the outlet duct 5 to be consumed, a slight decrease in pressure will occur upon the closing of the valve tube 8, thus permitting the diaphragm 20 to relax slightly and the tubular valve 8 to open slightly to permit a further flow of fluid into the valve chamber 2 and as the pressure in the chamber again increases the diaphragm will once again expand and eventually the tubular valve 8 will be closed again. In this manner the tubular valve 8 will remain in a crimped position and open and close repeatedly thus maintaining the effluent fluid pressure at very close to the desired value, which will normally vary by within about 2 mm. of mercury.

Referring now to FIGURE 2, the valve mechanism shown there is constructed in a manner similar to that shown in FIGURE 1, in that it includes a casing 3, a chamber 2, inlet and outlet ducts 4 and 5 respectively, a crimpable tubular valve 8, a bevelled tube 9, a rigid connecting wire 13 and a flexible diaphragm 20. Additionally an annular apertured flange 30 is provided about the upper open end of the casing 3 to which is attached a second cylindrical casing 26 provided with an annular, apertured flange 31 which mates with flange 30. The two flanges 30 and 31 are connected together, with the diaphragm 20 clamped between them, by means of bolts 28 which pass through the apertures in the flanges 30 and 31 and corresponding apertures in the diaphragm 20, and nuts 33.

Accordingly there is provided in addition to chamber 2 a control chamber 35. A fluid duct 36 is provided in the casing 26 defining chamber 35.

The control chamber 35 is employed to provide a reference pressure and by adjusting and maintaining the pressure in the control chamber 35 to just below the desired effluent fluid pressure with the actual difference in pressures between the two chambers 2 and 35 depending upon the actual design of the valve assembly, any desired effluent fluid pressure may be made available from the valve mechanism. The operation of this embodiment of the invention is the same as that of the embodiment shown in FIGURE 1 except that the pressure variations for various flow rates is effected by the volume of the control chamber which can be effectively increased by relying upon additional chamber in the form of a pressure tank or the like connected to the control chamber via a tube and fluid duct 36. Preferably the total control chamber volume should be at least 500 ml.

As will no doubt be appreciated the pressure in the control chamber may be readily adjusted by connecting a source of fluid under pressure to the chamber 35 by means of a tube (not shown) and fluid duct 36 and attaining the desired pressure through the use of a needle valve interposed between the source of fluid under pressure and the chamber 35.

Referring now to FIGURE 3, the components of this embodiment of the valve mechanism are similar to those shown in FIGURE 2 except that some of them are rearranged so that the diaphragm to hose link in the form of connecting wire 13, is capable of positively moving tube 9 down as well as up in response to movement of the diaphragm in order that the tubular valve 8 will be crimped closed when the fluid pressure in chamber 2 falls below the pressure in chamber 35, in order to control pressures of less than one atmosphere such as are available from a vacuum pump, i.e. to control vacuum pressures.

This is achieved by re-positioning duct 4 which now effectively becomes the outlet duct in the base of casing 2 and by enlarging stiff wire 13 on both sides of the hole 15 in the tube 9 so that when the diaphragm 20 is forced downwardly the free end of the valve tube 8 is also forced downwardly into a crimped configuration thus to close it.

In other words the valve mechanism of FIGURE 3 is employed to maintain a steady partial vacuum and consequently the outlet duct 5 becomes the inlet duct and the inlet duct 4 becomes the outlet duct which would be connected by suitable means to the fluid intake of a vacuum pump (not shown).

Since this model of the valve mechanism is to be used to control exhaust pressures or partial vacuums the reference pressure in the control chamber 35 can be achieved by connecting an aspirator or vacuum pump to the chamber 35 through the duct 36 in any suitable manner and employing a needle valve and the suction or pressure of the aspirator line or exhaust line to obtain the required pressure.

In summary, a simple, inexpensive, and yet reliable fluid pressure control valve mechanism has been provided which is suitable for controlling fluid pressures within close tolerances, which are either lower or higher than one atmosphere.

I claim:
1. A fluid pressure control valve mechanism comprising a cylindrical casing having one open end and one closed end; a flexible diaphragm movable in response to a change in fluid pressure thereon secured over the open end of said casing, said casing in conjunction with said diaphragm providing a fluidtight valve chamber; fluid inlet and outlet ducts communicating with said chamber, said inlet duct being located in the side wall of said cylindrical casing and said outlet duct being located in the closed end of said cylindrical casing; a crimpable tubular valve secured within said chamber to said outlet duct; and a rigid wire member connecting said valve and said diaphragm so that movement of said diaphragm in response to a change in fluid pressure thereon causes actuation of said valve.

2. A fluid pressure control valve mechanism comprising a casing; a diaphragm associated with said casing, said diaphragm being moveable between a first and a second position in response to a change in fluid pressure on said diaphragm, said casing in conjunction with said diaphragm providing a fluidtight valve chamber; a fluid inlet duct for admitting fluid into said valve chamber and a fluid outlet duct for discharging fluid from said chamber; a crimpable tubular valve secured within said chamber, said valve having two ends, one end being secured to one of said ducts to control fluid flow therethrough and the other end of said valve being free to move and to discharge fluid directly into said chamber; said free end being moveable to bend said valve repeatedly between an uncrimped open position and a crimped closed position; and means interconnecting said diaphragm and said free end of said valve so that fluid pressure initiated movement of said diaphragm towards its first position causes said valve to move towards its open position and fluid pressure initiated movement of said diaphragm towards its second position causes said valve to move towards its closed position 3. A fluid pressure control mechanism as in claim 2 wherein the means interconnecting said diaphragm and said free end is a rigid wire.

4. A control valve as in claim 2 including a rigid tube attached to said free end of said crimpable valve, and said interconnecting means attach said rigid tube to said diaphragm.

5. A fluid pressure control valve mechanism comprising a casing; a diaphragm associated with said casing, said diaphragm being moveable between a first and a second position in response to a change in fluid pressure on said diaphragm, said casing in conjunction with said diaphragm providing a fluidtight valve chamber on one side of said diaphragm and a control chamber on the other side of said diaphragm; a fluid inlet duct for admitting fluid into said valve chamber and a fluid outlet secured to said valve chamber and a duct for introducing fluid into said control chamber; a crimpable tubular valve located within said valve chambed and connected directly to one of said valve chamber ducts to control fluid flow therethrough, the unconnected end of said valve being free to move in said valve chamber, said valve being bendable repeatedly between an uncrimped open position and a crimped closed position; and means interconnecting said diaphragm and said valve so that fluid pressure initiated movement of said diaphragm towards its first position causes said valve to move towards its open position and fluid pressure initiated movement of said diaphragm towards its second position causes said valve to move towards its closed position.

References Cited by the Examiner
UNITED STATES PATENTS

| | | | |
|---|---|---|---|
| 1,018 | 7/1860 | Bidwell | 137—505.38 |
| 2,432,082 | 12/1947 | Bilyeu | 251—4 X |
| 2,731,039 | 1/1956 | Barrett | 251—5 X |
| 2,827,919 | 3/1958 | Rice | 137—5-5.47 |
| 2,867,241 | 1/1959 | Fitz Harris | 92—103 |
| 2,951,495 | 9/1960 | Johnston | 251—5 X |
| 2,986,160 | 5/1961 | Acomb | 251—5 X |

ISADOR WEIL, *Primary Examiner.*